No. 780,727. PATENTED JAN. 24, 1905.
T. PENDERGAST.
BUNG EXTRACTOR.
APPLICATION FILED OCT. 22, 1903.

No. 780,727. Patented January 24, 1905.

UNITED STATES PATENT OFFICE.

THOMAS PENDERGAST, OF LANCASTER, PENNSYLVANIA, ASSIGNOR OF FIFTY-ONE ONE-HUNDREDTHS TO JOHN HERTZLER, OF LANCASTER, PENNSYLVANIA.

BUNG-EXTRACTOR.

SPECIFICATION forming part of Letters Patent No. 780,727, dated January 24, 1905.

Application filed October 22, 1903. Serial No. 178,097.

*To all whom it may concern:*

Be it known that I, THOMAS PENDERGAST, a citizen of the United States, residing at Lancaster, in the county of Lancaster and State of Pennsylvania, have invented certain new and useful Improvements in Bung-Extractors; and I do hereby declare the following to be a full, clear, and exact description of the invention, such as will enable others skilled in the art to which it appertains to make and use the same.

My invention consists of a simple, convenient, and efficient tool for use in breweries, liquor warehouses and stores, particularly for extracting bungs or plugs from liquor casks or barrels, though it is also adapted for other purposes, such as forcing the stoppers or corks through the bungs when the casks are empty.

In the accompanying drawings, which are to be taken as a part of this specification, I have represented a preferred form of my improved device, illustrating, in—

Figure 1:
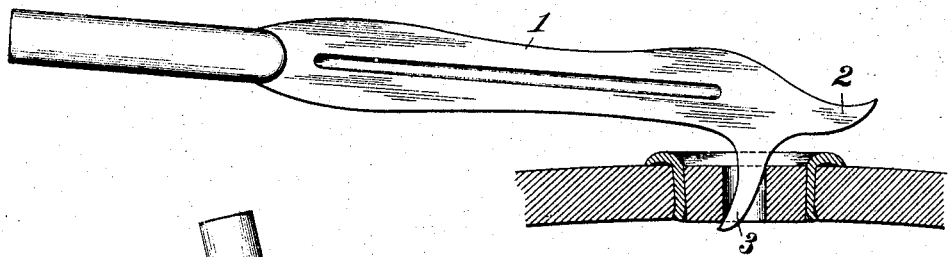
Figure 2:
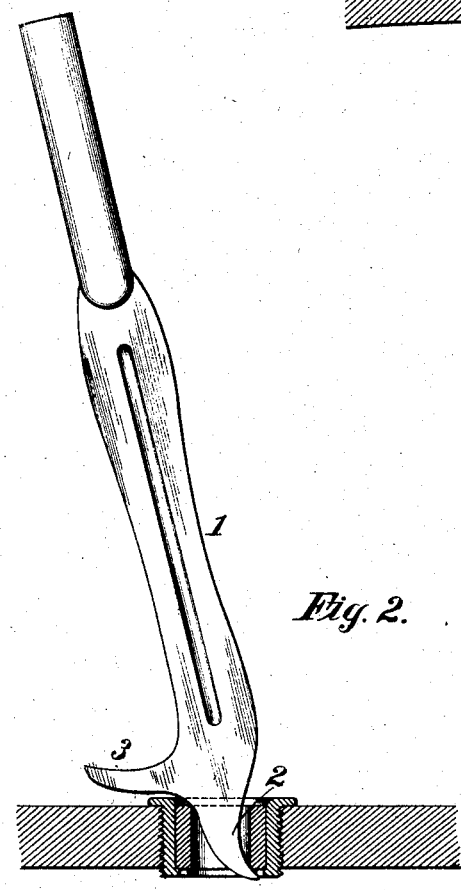

Figure 1, an application thereof to the extraction of one well-known form of bung, and in Fig. 2 an application to another well-known form of bung.

The device shown consists of a stock or shank in the form of a pry or lever having at one end two oppositely or differently projecting prongs or pry-points adapted for extracting different kinds of bungs and either one of which may serve as a support or fulcrum for prying out a bung or plug with the other prong.

The shank is indicated in the drawings by the reference-numeral 1, and the prongs or pry-points by the numerals 2 and 3. It will be observed that the pronged end or neck of the shank curves slightly downward or out of the general line of its length and the two curved prongs divide or extend oppositely therefrom in such manner or shape that one prong, 2, lies substantially in the general line of the length of the shank and the other prong, 3, projects laterally or approximately at right angles, while the extremities of the prongs are pointed oppositely or curved backward with respect to each other. However, by lengthening the said neck or curved part of the shank the location of the prongs would be accordingly changed. The prong 3 is especially suitable for prying out the ordinary larger-sized bungs or plugs having small central openings, such as are used in the sides of casks, as represented in Fig. 1. The prong is simply inserted down into the hole of the bung or plug, and the shank or pry is raised, so that the prong which hooks under or engages the bung will extract it. The prong 2 is especially adapted for extracting the smaller-sized bungs having larger openings, such as are used in the heads or ends of casks, as represented in Fig. 2. The prong is inserted down into the hole of the bung, so as to engage its under side, and pryed out by bearing down on the shank or pry. In either case the bung may also be extracted, if desired, without breaking the usual frangible diaphragm or core in the center by simply engaging the bung by the correct prong or point and prying in the proper way on the shank. In whichever way the tool is pryed one prong may serve as a fulcrum or support for prying out the bung or plug with the other prong, and as the extremities of the prongs curve oppositely or backwardly the prong which serves as the fulcrum will not stick in or deface the wood. The prongs may of course be put to other uses—such, for example, as extracting or prying out the corks or stoppers from the bungs.

The stock or shank is shown in the form of a flat bar, which is the preferred construction for strength combined with lightness of weight, though of course not essential. The free end of the shank is preferably formed round, or substantially so, as shown, for the purpose of serving as a convenient handle for the tool, and said round portion may be used as a hammer or ram for forcing the corks or stoppers into the empty kegs or casks.

Having thus described my invention, what I claim as new, and desire to secure by Letters Patent of the United States, is—

The herein-described bung-extractor consisting of a shank or pry having a curved neck with the divergent prongs 2 and 3, all in the plane of the shank and the said neck and prongs substantially in the form of a fish-tail, the prong 2 extending from the neck in the general line of length of the shank and slightly up-curved and adapted to be inserted into small-sized bushings, and the prong 3 extending laterally from the base of the neck and slightly back-curved and adapted to be inserted into large-sized bushings, and each prong adapted to serve as a fulcrum for prying out with the other.

In testimony whereof I affix my signature in presence of two witnesses.

THOMAS PENDERGAST.

Witnesses:
REDMOND CONYNGHAM,
J. FRANK REMLEY.